July 23, 1957 G. CESAR 2,800,013
HANDLE CONNECTION FOR TUCK POINTING TOOLS AND THE LIKE
Filed May 19, 1955
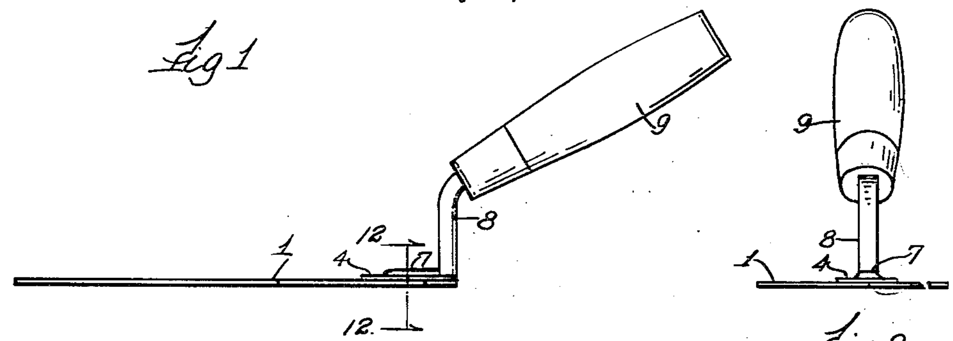
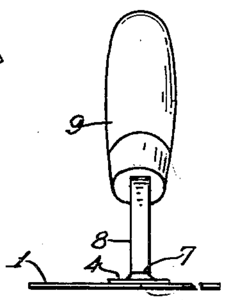
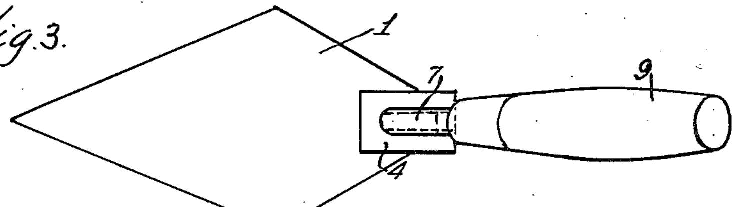
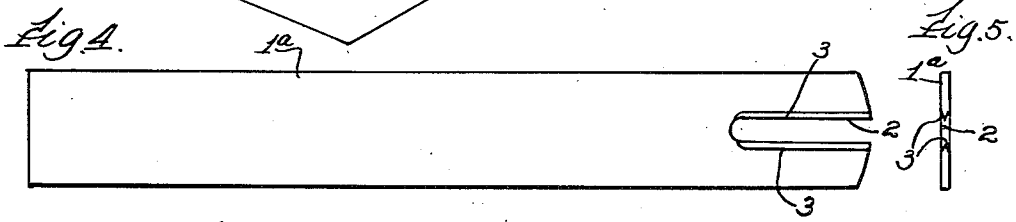
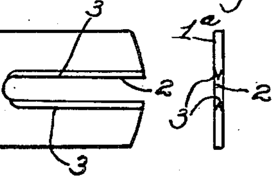
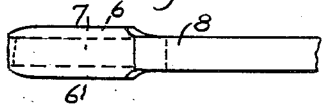
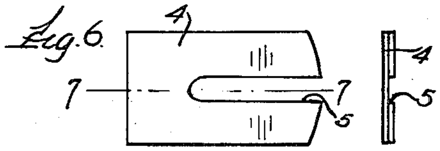
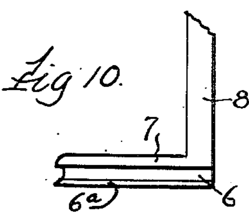
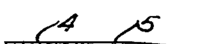
Fig 7 Fig 8
Fig 11. 8 7 6 6a 6a 6
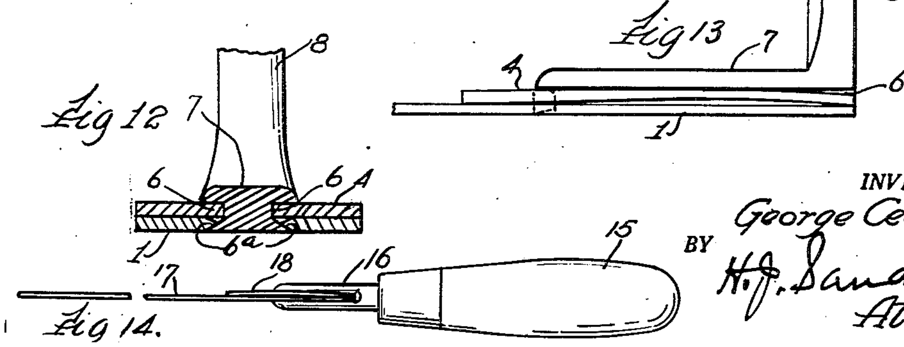
INVENTOR.
George Cesar.
BY
H. J. Sanders
Attorney.

United States Patent Office 2,800,013
Patented July 23, 1957

2,800,013

HANDLE CONNECTION FOR TUCK POINTING TOOLS AND THE LIKE

George Cesar, Chicago, Ill.

Application May 19, 1955, Serial No. 509,508

2 Claims. (Cl. 72—136)

This invention relates to masonry tools and more particularly to holding devices for masonry tools of that class requiring or including a releasable handle structure especially adaptable for use with tuck pointing tools, trowels, reversible files, and the like.

One object is to provide a handy, convenient releasable handle structure which, in use, is fixedly secured to the working portion of the instrument in connection with which it is used, which is adjustable and which may be readily detached or separated therefrom at will.

A still further object is to provide a handle connection for masonry tools that is simple in structure, that employs no screws, bolts, clamps or the like, that is inexpensive to manufacture and durable in use.

With the foregoing and other objects in view the invention will become apparent from the following description, defined in the claims and illustrated in the accompanying drawings, forming part of this disclosure, and in which—

Fig. 1 is a view in side elevation of a tuck pointing tool embodying the invention.

Fig. 2 is a front view of Fig. 1.

Fig. 3 is a top plan view of a trowel embodying the invention.

Fig. 4 is a plan view of the blade portion of another tool according to this invention.

Fig. 5 is an end view of Fig. 4, at right angles thereto.

Fig. 6 is a face view of a key or wedge lock employed.

Fig. 7 is a longitudinal sectional view through Fig. 6 on the line 7—7.

Fig. 8 is an end view of Fig. 6, in a position at right angles thereto.

Fig. 9 is an enlarged fragmentary view of the tool shank.

Fig. 10 is a side elevational view of Fig. 9.

Fig. 11 is an end view of Fig. 10.

Fig. 12 is an enlarged cross sectional view through Fig. 1 on the line 12—12.

Fig. 13 is an enlarged fragmentary view in side elevation, and

Fig. 14 is a view of a slightly modified form showing the handle applied to a reversible file.

The reference characters 1, 1*a* denote a tuck pointing tool or blade in one end of which is formed a terminal slot 2 that opens through the blade rear end, said slot being of a suitable length, the top face of each member 1, 1*a* having the beveled portion 3 extending inwardly from said rear end. The slot 2 has its side walls beveled, each side wall of each slot beveled from its longitudinal inner edge to the relatively adjacent face of the member 1 to provide a reversible blade.

Received upon the slotted end of each tool member 1, 1*a* upon its upper face is the resilient slotted metal key 4 having a slight curvature or arc shape from one end to the other, said key being of a length approximately one-quarter the length of member 1 or 1*a* and, as shown in Fig. 5, having a square edge slot 5 in one end corresponding to the slot 2 and of approximately the same extent, said key being received upon the slotted end of said member in aligned relation therewith.

The tool blade or member 1 or 1*a* and key 4 are received, slotted end first, in the elongated lateral open ended recesses 6, 6 beveled only along their lower walls 6*a* in the stud-like extension 7 formed integral with the neck 8 and disposed at right angles thereto, the opposite end of said neck 8 bent at an angle thereto and carrying the hand grip 9 disposed at approximately a 45 degree angle to said tool member 1, said extension engaging said tool recesses 3 to provide maximum grip.

The handle structure which includes the grip 9, neck 8 and stud 7 are readily secured to the member 1 or 1*a* by means of the key 4, the tapered slotted portions 2, 5 obtaining a positive friction or wedge-like grip upon said members without the use of screws, nails or the like, and said parts may be easily separated without the use of tools, as for shipping, storage, packing or the like, and replacement of parts readily made due to the structure of the tool.

Referring now to Fig. 14 a hand grip 15 is connected by a bifurcated shank 16 to the work member 17 and resilient slightly arced key 18 which members are yieldingly received in said shank and frictionally there retained.

What is claimed is:

1. The combination in a masonry tool of, a tuck pointing tool as an expendable member supported only at its rear end, said tool member having a longitudinally extending slot in said rear end opening outwardly, the side walls of said slot being beveled, a slotted resilient slightly arced key, said key received upon the rear end of said tool in aligned relation therewith, a handle having a shank portion, an extension carried by said shank portion, said extension having oppositely disposed peripheral recesses releasably receiving and gripping the slotted portions of said tool member and of said key and detachably securing said extension operatively to said members.

2. The combination in a masonry tool of, a tuck pointing tool as an expendable reversible tool member, supported only at its rear end, said tool member having a longitudinally extending slot in said rear end opening outwardly, the side walls of said slot being beveled from its longitudinal inner edge to the relatively adjacent face of said tuck pointing tool, an arced key having a slot corresponding to said tool slot, said key received upon the rear end of said tool in aligned relation therewith with its slot in alignment with said tool member slot to permit reversal of said tool member, a handle having a shank portion, an extension carried by said shank, said extension having oppositely disposed recesses releasably receiving and gripping the slotted portions of said tool member and of said key detachably securing said extension operatively to said members.

References Cited in the file of this patent

UNITED STATES PATENTS

| | | |
|---|---|---|
| 2,594,878 | Davis | Apr. 29, 1952 |
| 2,688,504 | Parker | Sept. 7, 1954 |
| 2,704,680 | Bedford | Mar. 22, 1955 |